United States Patent [19]

Hongo et al.

[11] Patent Number: 5,110,866
[45] Date of Patent: May 5, 1992

[54] THERMOPLASTIC POLYESTER RESIN COMPOSITION HAVING IMPROVED IMPACT RESISTANCE

[75] Inventors: Masafumi Hongo; Hideyuki Shigemitsu, both of Hiroshima, Japan

[73] Assignee: Mitsubishi Rayon Company Ltd., Tokyo, Japan

[21] Appl. No.: 493,599

[22] Filed: Mar. 5, 1990

[30] Foreign Application Priority Data

Mar. 6, 1989 [JP] Japan .................................. 1-53129

[51] Int. Cl.⁵ .............................................. C08L 67/02
[52] U.S. Cl. ...................................... 525/67; 525/64; 525/68
[58] Field of Search ............................ 525/67, 64, 68

[56] References Cited

U.S. PATENT DOCUMENTS 4,866,130  9/1989  Brown ................................ 525/68

FOREIGN PATENT DOCUMENTS 295706  12/1988  European Pat. Off. ............. 525/64
297142  1/1989   European Pat. Off. .
304040  2/1989   European Pat. Off. .

OTHER PUBLICATIONS

Patent Abstracts of Japan, vol. 12, No. 353(C-530) 21 Sep. 1988, & JP-A-63 108053 (Mitsubishi Petrochemical Co. Ltd.) 12 May 1988.
Patent Abstracts of Japan, vol. 12, No. 326(C-525) 5 Sep. 1988, & JP-A-63 089564 (Mitsubishi Petrochemical Co. Ltd.) 20 Apr. 1988.
Patent Abstracts of Japan, vol. 14, No. 96 (C-692) 22 Feb. 1990, & JP-A-01 304153 (Japan Synthetic Rubber Co. Ltd.). 07 Dec. 1989.

*Primary Examiner*—Patricia Short
*Attorney, Agent, or Firm*—Oblon, Spivak, McClelland, Maier & Neustadt

[57] ABSTRACT

A thermoplastic polyester resin composition having an improved impact resistance is disclosed. This composition is comprised of (A) 30 to 70 weight parts of a polyester resin composed mainly of a polyalkylene terephthalate, (B) 5 to 28 weight parts of a polycarbonate resin, (C) 5 to 35 weight parts of a graft copolymer obtained by graft-polymerizing a monomer selected from aromatic vinyl monomers and methacrylic acid ester monomers in the presence of a rubbery polymer, and (D) 10 to 45 weight parts of a polyphenylene ether resin, which further comprises (E) 2 to 20 weight parts, per 100 weight parts of the resin composition comprising the components (A) through (D), of a copolymer having a main chain of a polyolefin copolymerized with glycidyl methacrylate and a side chain of a styrene polymer, in which the content of glycidyl methacrylate in the polyolefin copolymerized with glycidyl methacrylate is 5 to 30 weight %.

10 Claims, No Drawings

THERMOPLASTIC POLYESTER RESIN COMPOSITION HAVING IMPROVED IMPACT RESISTANCE

BACKGROUND OF THE INVENTION (1) Field of the Invention

The present invention relates to a thermoplastic polyester resin composition, from which a molded article having excellent heat resistance and impact resistance can be obtained.

(2) Description of the Related Art

Thermoplastic polyesters, for example, polyalkylene terephthalates, have an excellent moldability, mechanical properties, heat-resistant stability, weatherability and electrically insulating properties, and therefore, are widely used as electrical and electronic parts, automobile parts and the like. Nevertheless, the application of these resins are considerably limited because the rigidity thereof at high temperature is low and the impact resistance thereof, especially the notched impact strength, is low.

The application of a thermoplastic polyester resin to a shell plate material of an automobile for on-line coating, utilizing its excellent mechanical and thermal properties has been attempted, but this application is not practically possible because the rigidity at high temperatures and the impact resistance are too low. If a glass fiber, carbon fiber, or wollastonite is filled in the thermoplastic polyester resin, the rigidity at high temperatures is improved, but the impact resistance and surface appearance become poor. If a rubber reinforcing resin is incorporated in the thermoplastic polyester resin, the impact resistance is improved, but the heat resistance represented by the modulus of elasticity at high temperatures becomes low and the resulting composition cannot withstand on-line coating. Moreover, since the linear expansion coefficient is large and sink marks are conspicuous on a rib or boss of a molded article, the composition cannot be applied to a shell plate of an automobile.

It is taught in Japanese Examined Patent Publication No. 51-21664 that the molding processability of a polyphenylene ether resin can be improved by incorporating polyethylene terephthalate or polybutylene terephthalate, but a satisfactory impact resistance cannot be obtained by this proposal.

The inventors previously proposed a composition comprising a polyester resin, a polycarbonate resin, a graft copolymer and a polyphenylene ether resin (Internation Publication No. 88-04310). In this composition, the heat resistance, impact resistance and linear expansion coefficient are improved, but the impact resistance is still low and the composition cannot be applied to an article for which a high impact resistance is required, for example, a fender and a bumper.

SUMMARY OF THE INVENTION

A primary object of the present invention is to provide a composition comprising, as main components, a thermoplastic polyester resin, a polycarbonate resin, and a polyphenylene ether resin and having an improved impact resistance.

In accordance with the present invention, there is provided a thermoplastic resin composition having an improved impact resistance, which comprises (A) 30 to 70 parts by weight of a polyester resin composed mainly of units derived from an aromatic dicarboxylic acid having 8 to 22 carbon atoms or a functional derivative thereof and units derived from an alkylene glycol, cycloalkylene glycol, or aralkylene glycol, having 2 to 22 carbon atoms, (B) 5 to 28 parts by weight of a polycarbonate resin, (C) 5 to 35 parts by weight of a graft copolymer obtained by graft-polymerizing at least one monomer selected from the group consisting of aromatic vinyl monomers and methacrylic acid ester monomers in the presence of a rubbery polymer, and (D) 10 to 45 parts by weight of a polyphenylene ether resin, which further comprises (E) 2 to 20 parts by weight, per 100 parts by weight of the resin composition comprising the components (A) through (D), of a copolymer having a main chain of a polyolefin copolymerized with glycidyl methacrylate and a side chain of a styrene polymer, in which the content of glycidyl methacrylate in the polyolefin copolymerized with glycidyl methacrylate is 5 to 30% by weight.

DESCRIPTION OF THE PREFERRED EMBODIMENTS

The polyester resin (A) used in the present invention is mainly composed of units derived from an aromatic dicarboxylic acid having 8 to 22 carbon atoms or a functional derivative thereof and units derived from an alkylene glycol, cycloalkylene glycol, or aralkylene glycol, having 2 to 22 carbon atoms. The term "mainly" used herein means that the units derived from the aromatic dicarboxylic acid or a functional derivative thereof occupy at least 50% by weight of the units derived from the entire dicarboxylic acid ingredients, and the units derived from the alkylene glycol, cycloalkylene glycol or aralkylene glycol occupy at least 50% by weight of the units derived from the entire glycol ingredients. If desired, the polyester resin (A) may comprise a minor amount of units derived from an aliphatic dicarboxylic acid such as adipic acid or sebacic acid, or the polyester (A) may comprise units derived from a polyalkylene glycol such as polyethylene glycol or polybutylene glycol. Polybutylene terephthalate, polyhexylene terephthalate and polyethylene terephthalate are preferably used as the polyester resin, and polybutylene terephthalate is most preferable. These polyester resins can be used alone or in the form of a mixture of two or more thereof.

The amount of the polyester resin (A) composed mainly of the polyalkylene terephthalate in 100 parts by weight of the resin composition comprising the components (A) through (D) (hereinafter referred to as "resin mixed composition") is 30 to 70 parts by weight. If the amount of the polyester resin (A) is outside this range, it is difficult to obtain the intended resin composition of the present invention.

The polycarbonate resin (B) used in the present invention is obtained from a dihydroxydiarylalkane, and optionally the polycarbonate resin (B) may be branched. The polycarbonate resin is prepared by a known process, and usually, the polycarbonate resin is prepared by reacting a dihydroxyl and an optional polyhydroxyl compound with phosgene or a diester of carbonic acid. Appropriate dihydroxydiarylalkanes include those having an alkyl group, a chlorine atom or a bromine atom at the ortho-position relative to the hydroxyl group. As preferable examples of the dihydroxydiarylalkane, there can be mentioned 4,4'-dihydroxy-2,2-diphenylpropane (bisphenol A), tetramethylbisphenol A and bis-(4-hydroxyphenyl)-p-diisopropylbenzene. The branched polycarbonate is prepared, for example, by substituting a part, for example, 0.2 to 2 mole %, of the dihydroxyl compound by a polyhydroxyl compound. As specific examples of the polyhydroxyl compound, there can be mentioned phloroglucinol, 4,6-dimethyl-2,4,6-tri-(4-hydroxyphenyl)-heptene, 4,6-dimethyl-2,4,6-tri-(4-hydroxyphenyl)-heptane and 1,3,5-tri(4-hydroxyphenyl)-benzene.

The amount of the polycarbonate resin (B) in 100 parts by weight of the mixed resin composition is 5 to 28 parts by weight. If the amount of the polycarbonate resin is smaller than 5 parts by weight, the impact resistance of a molded article prepared from the obtained resin composition is poor, and if the amount of the polycarbonate resin is larger than 28 parts by weight, the rigidity at high temperatures is impaired.

The graft copolymer (C) used in the present invention is obtained by graft-polymerizing at least one monomer selected from the group consisting of aromatic vinyl monomers and methacrylic acid ester monomers in the presence of a rubbery polymer. As the rubber polymer, there can be mentioned polybutadiene rubbers, copolymers comprising at least 50% by weight of butadiene units and a minor amount of styrene units or acrylonitrile units such as a styrene/butadiene copolymer and an acrylonitrile/butadiene copolymer, polyacrylic acid ester rubbers such as poly(butyl acrylate), polyorganosiloxane rubbers, composite rubbers such as a polybutadiene/poly(butyl acrylate) two-stage rubbery polymer comprising poly(butyl acrylate) formed on the periphery of polybutadiene, composite rubbers comprising other combination of the above-mentioned rubbery polymers, and mixtures of two or more of the above-mentioned rubbery polymers. A graft copolymer (C) in which the rubbery polymer content is 30 to 80% by weight based on the graft copolymer is preferable.

As the aromatic vinyl monomer used for the graft polymerization, there can be mentioned styrene and α-methylstyrene, and as the methacrylic acid ester monomer, there can be mentioned methyl methacrylate and ethyl methacrylate. These monomers can be used alone or in the form of a mixture of two or more thereof. When carrying out the present invention, a minor amount of another copolymerizable monomer can be used in addition to the above-mentioned aromatic vinyl monomer and methacrylic acid ester monomer. As the other copolymerizable monomer, there can be mentioned acrylic acid ester monomers such as methyl acrylate and butyl acrylate, and maleimide monomers such as N-phenylmaleimide. The use of vinyl cyanide monomers such as acrylonitrile and methacrylonitrile is not recommended because the rigidity at high temperatures and the impact resistance become poor in a molded article prepared from the obtained resin composition.

The amount of the aromatic vinyl monomer, methacrylic acid ester, and optional other copolymerizable monomer, to be used for the graft copolymerization is such that the content of these monomers in the graft copolymer (C) is 20 to 70% by weight.

A graft copolymer in which styrene units are present in the outermost layer is especially preferable. This graft copolymer can be obtained by the stepwise graft polymerization whereby a styrene type monomer is graft-polymerized at the final stage or by the simultaneous graft polymerization of a mixture containing a styrene type monomer.

The amount of the above-mentioned graft polymer (C) in 100 parts by weight of the mixed resin composition is 5 to 35 parts by weight. If the amount of the graft polymer (C) is smaller than 5 parts by weight, the impact resistance of a molded article prepared from the obtained resin composition is low, and if the amount of the graft polymer (C) is larger than 35 parts by weight, the rigidity at high temperatures becomes poor.

The polyphenylene ether resin (D) used in the present invention is a homopolymer or copolymer having recurring units represented by the following formula:

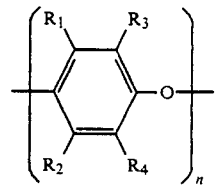

wherein $R_1$, $R_2$, $R_3$ and $R_4$ are independently selected from the group consisting of a hydrogen atom, alkyl groups, halogen atoms, a nitro group and an amino group, and n is a number of at least 30, preferably at least 50.

As specific examples of the polyphenylene ether resin, there can be mentioned poly(2,6-dimethyl-1,4-phenylene)ether, poly(2,3,6-trimethyl-1,4-phenylene)ether, poly(2,6-diethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, a (2,6-dimethyl-1,4-phenylene)ether/(2,3,6-trimethyl-1,4-phenylene)ether copolymer, a (2,6-dimethyl-1,4-phenylene)ether/(2,3,6-trimethyl-1,4-phenylene)ether copolymer, and a (2,6-dimethyl-1,4-phenylene)ether/(2,3,6-triethyl-1,4-phenylene)ether copolymer. Poly(2,6-dimethyl-1,4-phenylene)ether, poly(2,3,6-trimethyl-1,4-phenylene)ether and a (2,6-dimethyl-1,4-phenylene)ether/(2,3,6-trimethyl-1,4-phenylene)ether copolymer are especially preferable.

The polymerization degree of the polyphenylene ether resin used in the present invention is not particularly critical, but a polyphenylene ether resin having a reduced viscosity of 0.3 to 0.7 dl/g as measured at 25° C. in chloroform as the solvent is preferable. If the reduced viscosity is lower than 0.3 dl/g, the thermal stability becomes poor, and if the reduced viscosity is higher than 0.7 dl/g, the moldability is often unsatisfactory. These polyphenylene ether resins can be used alone or in the form of a mixture of two or more thereof. Furthermore, to improve the moldability, up to 40% by weight of a polystyrene resin can be incorporated into the polyphenylene ether resin (D).

The amount of the polyphenylene ether resin (D) in 100 parts by weight of the mixed resin composition is 10 to 45 parts by weight. If the amount of the polyphenylene ether is smaller than 10 parts by weight, the effect of improving the rigidity at high temperatures in a molded article obtained from the resin composition is poor, and if the amount of the polyphenylene ether resin (D) is larger than 45 parts by weight, the impact resistance is often too low.

The copolymer (E) used in the present invention is a copolymer comprising a main chain of a polyolefin copolymerized with glycidyl methacrylate and a side chain of a styrene polymer, in which the amount of glycidyl methacrylate in the polyolefin copolymerized with glycidyl methacrylate is 5 to 30% by weight.

As the olefin used for the copolymer (E), there can be mentioned α-olefins such as ethylene, propylene and butene-1, and a preferable polyolefin is polyethylene which occupies at least 50 mole % of the main chain of the copolymer (E).

As the styrene polymer constituting the side chain of the copolymer (E), there can be mentioned a homopolymer of styrene and a copolymer of styrene with up to 20% by weight of other copolymerizable monomer. As the copolymerizable monomer, there can be mentioned maleic anhydride and methyl methacrylate. Copolymerization with a vinyl cyanide monomer such as acrylonitrile or methacrylonitrile is not preferable because the effect of improving the impact resistance is poor.

The content of glycidyl methacrylate in the polyolefin copolymerized with glycidyl methacrylate is 5 to 30% by weight. If this content of glycidyl methacrylate is lower than 5% by weight, the effect of improving the impact resistance is poor, and if the content of glycidyl methacrylate is higher than 30% by weight, the molding processability becomes poor, although the impact resistance is improved.

The content of the styrene polymer in the copolymer (E) is not particularly critical, but to attain the object of the present invention, preferably the content of the styrene polymer in the copolymer (E) is 10 to 90% by weight.

The amount incorporated of the copolymer (E) is 2 to 20 parts by weight per 100 parts by weight of the mixed resin composition comprising the components (A), (B), (C) and (D). If the amount of the copolymer (E) is smaller than 2 parts by weight, the effect of improving the impact resistance is poor, and if the amount of the copolymer (E) is larger than 20 parts by weight, the rigidity at high temperatures becomes poor.

The above-mentioned thermoplastic polyester composition of the present invention is formed by mixing together the above-mentioned components (A) through (E) in the above-mentioned amounts. In the present invention, the content of the polyester resin as the component (A) in the mixed resin composition is always made larger than the content of the polyphenylene ether resin as the component (D) in the mixed resin composition, so that the resin composed mainly of the polyester resin (A) forms the matrix phase and the polyphenylene ether (D) is dispersed in the form of particles or both the resin composed mainly of the polyester resin (A) and the polyphenylene ether (D) form matrix phases, and furthermore, the graft polymer (C) is predominantly present in the phase of the polyphenylene ether resin (D). Due to these features, in the composition of the present invention, excellent elastic modulus, impact resistance, linear expansion coefficient, and dimensional stability of a molded article at high temperatures, and an excellent heat resistance can be manifested while maintaining the inherent excellent moldability and mechanical properties of the polyester resin. The structure in which the polyester resin (A) is dispersed in the form of particles in the phase of the polyphenylene ether resin (D) is not preferred because the moldability is dramatically lowered.

From the viewpoint of the physical properties, preferably the graft copolymer (C) is predominantly present in the polyphenylene ether resin (D). In order to make the graft copolymer (D) predominantly present in the polyphenylene ether resin (D), a graft copolymer having the above-mentioned styrene units in the outermost layer is preferably used as the graft copolymer (C).

Various additives such as a flame retardant, a modifier, a release agent, a light or heat stabilizer, a reinforcing filler, a dye, and a pigment can be incorporated into the thermoplastic polyester resin composition of the present invention according to need.

Known processes can be used for the preparation of the thermoplastic polyester resin of the present invention. In general, the respective components are blended by a blending device customarily used for blending resins, such as a Henschel mixer or a tumbler, and the blend is melt-kneaded by a device customarily used for shaping, such as a single-screw extruder, a twin-screw extruder or an injection molding machine, whereby the thermoplastic polyester composition is prepared.

The present invention will now be described in detail with reference to the following examples. In the examples, all of "parts" and "%" are by weight.

In the examples and comparative examples, the physical properties were evaluated by the following methods.

(1) Izod impact strength

The Izod impact strength was measured at a temperature of 23° C. and a relative humidity of 50% according to ASTM D-256 (unit: kg.cm/cm) wherein notched test pieces having a thickness of ¼ inch and notched test pieces having a thickness of ⅛ inch were used.

(2) Heat sagging test

Using a test piece having a thickness of ⅛ inch, a width of ½ inch and a length of 5 inches, the heat sagging test was carried out at 160° C. for 1 hour at an overhang length of 100 mm, and the sag of the test piece was measured (unit:mm).

(3) Short-Shot Pressure (SS Pressure)

The short shot pressure was determined as the percentage based on the maximum pressure (2,000 kg·f/cm$^2$) at the molding of a 100 mm square plate having a thickness of 3 mm at a cylinder temperature of 260° C. by M-100 (supplied by Meiki Co.) (unit:%).

The polyphenylene ether resin used in the examples and comparative examples was a (2,6-dimethyl-1,4-phenylene)ether/(2,3,6-trimethyl-1,4-phenylene)ether copolymer having a reduced viscosity ($\eta$sp/c) of 0.59 as determined at 25° C. with respect to a 0.1% solution in chloroform by using a Ubbellohde viscometer. A polytetramethylene terephthalate resin having an intrinsic viscosity [$\eta$] of 1.05 was used as the polybutylene terephthalate resin. As the polyethylene terephthalate resin, "PA-200" supplied by Mitsubishi Rayon Co. was used. The polycarbonate resin used was "7025A" marketed by Mitsubishi Kasei Corp.

REFERENTIAL EXAMPLE PREPARATION OF GRAFT POLYMER

A reaction vessel was charged with 59 parts (as solids) of a polybutadiene latex having a solid content of 33% and an average particle diameter of 0.08 μm, and then 1 part (as solids) of a latex of a copolymer comprising 85% of n-butyl acrylate units and 15% of methacrylic acid units and having an average particle diameter of 0.08 μm was added with stirring at ambient temperature, and stirring was continued for 30 minutes to obtain a latex of an agglomerated polybutadiene rubber having an average particle diameter of 0.28 μm. Then the inner atmosphere of the reaction vessel was replaced by nitrogen, and 50 parts of distilled water, 0.2 part of a naphthalenesulfonic acid/formaldehyde condensate (Temor N supplied by Kao Corp.), 0.02 part of sodium hydroxide, and 0.35 part of dextrose were added to the agglomerated polybutadiene latex with stirring. The temperature was elevated, and when the inner temperature reached 60° C., 0.05 part of ferrous sulfate and 0.2 part of sodium pyrophosphate were added. Immediately, a liquid mixture comprising 40 parts of styrene and 0.2 part of cumene hydroperoxide was continuously added dropwise to the mixture over a period of 60 minutes. After the dropwise addition, the mixture was allowed to stand for 1 hour, whereby the graft polymerization was completed. After cooling, the obtained graft polymer latex was coagulated by dilute sulfuric acid, and washed, filtered and dried according to customary procedures to obtain a graft polymer.

EXAMPLES 1 THROUGH 7 AND COMPARATIVE EXAMPLES 1 THROUGH 9

The above-mentioned polybutylene terephthalate resin, polyethylene terephthalate resin, and polycarbonate resin, the graft polymer prepared in the referential example, the above-mentioned polyphenylene ether resin, and a specific copolymer selected from copolymers I through VII shown below or polystyrene were mixed together at ratios shown in Table 1 for 5 minutes by a Henschel mixer, and by using a twin-screw extruder having a diameter of 30 mm, the obtained composition was melt-kneaded at a cylinder temperature of 260° C. and molded into pellets.

The pellets were dried and injection-molded at a cylinder temperature of 260° C and a mold temperature of 80° C. to obtain test pieces for an evaluation of various properties. The results of the evaluation are shown in Table 1.

As seen from the results shown in Table 1, a molded article having an excellent impact resistance can be prepared from the composition of the present invention, while maintaining a good moldability.

The copolymers used are as follows.

Copolymer I

A copolymer consisting of a main chain of a copolymer comprising 85% of ethylene units and 15% of glycidyl methacrylate units and a side chain of polystyrene, in which the main chain/side chain ratio is 70/30 by weight.

Copolymer II

A copolymer consisting of a main chain of a copolymer comprising 90% of ethylene units and 10% of glycidyl methacrylate units and a side chain of polystyrene, in which the main chain/side chain ratio is 50/50 by weight.

Copolymer III

A copolymer consisting of a main chain of a copolymer comprising 64% of ethylene units, 16% of propylene units and 20% of glycidyl methacrylate units and a side chain of a copolymer comprising 85% of styrene units and 15% of methyl methacrylate units, in which the main chain/side chain ratio is 60/40 by weight.

Copolymer IV

A copolymer comprising 85% of ethylene units and 15% of glycidyl methacrylate units.

Copolymer V

An ethylene/propylene copolymer (Tufmer P680 supplied by Mitsui Petrochemical Industries.

Copolymer VI

A copolymer consisting of a main chain of a copolymer comprising 97% of ethylene units and 3% of glycidyl methacrylate units and a side chain of polystyrene, in which the main chain/side chain ratio is 70/30 by weight.

Copolymer VII

A copolymer consisting of a main chain of a copolymer comprising 85% of ethylene units and 15% of glycidyl methacrylate units and a side chain of a copolymer comprising 70% of styrene units and 30% of acrylonitrile units, in which the main chain/side chain ratio is 70/30 by weight.

Polystyrene

Estyrene G-15 supplied by Nippon Steel Chemical Co.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Composition (parts) | | | | | | | | | | |
| Polybutylene terephthalate | 45 | 45 | 40 | 40 | 40 | 40 | — | 45 | 40 | 45 |
| Polyethylene terephthalate | — | — | — | — | — | — | 45 | — | — | — |
| Polycarbonate | 15 | 15 | 15 | 15 | 10 | 10 | 15 | 15 | 15 | 15 |
| Graft copolymer | 15 | 15 | 15 | 15 | 20 | 15 | 15 | 15 | 15 | 15 |
| Polyphenylene ether | 25 | 25 | 30 | 30 | 30 | 35 | 25 | 25 | 30 | 25 |
| Copolymer-I | 5 | — | — | 10 | — | 20 | 5 | 1 | — | — |
| Copolymer-II | — | 10 | — | — | 5 | — | — | — | — | — |
| Copolymer-III | — | — | 5 | — | — | — | — | — | 30 | — |
| Copolymer-IV | — | — | — | — | — | — | — | — | — | 10 |
| Copolymer-V | — | — | — | — | — | — | — | — | — | — |
| Copolymer-VI | — | — | — | — | — | — | — | — | — | — |
| Copolymer-VII | — | — | — | — | — | — | — | — | — | — |
| Polystyrene | — | — | — | — | — | — | — | — | — | — |
| Micro talc P1052*1 | 0.5 | 0.5 | 0.3 | 0.5 | 0.5 | 0.5 | 0.5 | 0.5 | 0.5 | 0.5 |
| MARK 2112*2 | 0.2 | 0.2 | 0.3 | 0.3 | 0.2 | 0.2 | 0.2 | 0.2 | 0.2 | 0.2 |
| MARK AO-60*3 | 0.2 | 0.2 | 0.2 | 0.2 | 0.2 | 0.2 | 0.2 | 0.2 | 0.2 | 0.2 |
| MARK AO-412B*4 | 0.2 | 0.2 | 0.2 | 0.2 | 0.2 | 0.2 | 0.2 | 0.2 | 0.2 | 0.2 |
| Physical properties | | | | | | | | | | |
| Izod impact ¼ inch | 25 | 30 | 20 | 25 | 28 | 30 | 15 | 15 | 20 | 18 |

TABLE 1-continued

| | | | | | | | | | | |
|---|---|---|---|---|---|---|---|---|---|---|
| strength (kgf · cm/cm) ⅛ inch | 35 | 40 | 30 | 40 | 30 | 30 | 15 | 15 | 20 | 20 |
| Heat sagging (mm) | 3 | 3 | 2 | 2 | 2 | 3 | 5 | 3 | 8 | 3 |
| Short shot pressure (%) | 48 | 49 | 49 | 50 | 49 | 52 | 55 | 47 | 62 | 64 |

| | Examples and Comparative Examples | | | | | |
|---|---|---|---|---|---|---|
| | Comp. Ex. 4 | Comp. Ex. 5 | Comp. Ex. 6 | Comp. Ex. 7 | Comp. Ex. 8 | Comp. Ex. 9 |
| Composition (parts) | | | | | | |
| Polybutylene terephthalate | 45 | 45 | 45 | 40 | 45 | — |
| Polyethylene terephthalate | — | — | — | — | — | 45 |
| Polycarbonate | 15 | 15 | 15 | 10 | 15 | 15 |
| Graft copolymer | 15 | 15 | 15 | 20 | 15 | 15 |
| Polyphenylene ether | 25 | 25 | 25 | 30 | 25 | 25 |
| Copolymer-I | — | — | — | — | — | — |
| Copolymer-II | — | — | — | — | — | — |
| Copolymer-III | — | — | — | — | — | — |
| Copolymer-IV | — | — | — | — | — | — |
| Copolymer-V | 5 | — | — | — | — | — |
| Copolymer-VI | — | 5 | — | — | — | — |
| Copolymer-VII | — | — | 5 | — | — | — |
| Polystyrene | — | — | — | 5 | — | — |
| Micro talc P1052*1 | 0.5 | 0.5 | 0.5 | 0.5 | 0.5 | 0.5 |
| MARK 2112*2 | 0.2 | 0.2 | 0.2 | 0.2 | 0.2 | 0.2 |
| MARK AO-60*3 | 0.2 | 0.2 | 0.2 | 0.2 | 0.2 | 0.2 |
| MARK AO-412B*4 | 0.2 | 0.2 | 0.2 | 0.2 | 0.2 | 0.2 |
| Physical properties | | | | | | |
| Izod impact ¼ inch strength | 7 | 15 | 15 | 7 | 15 | 7 |
| (kgf · cm/cm) ⅛ inch | 8 | 15 | 15 | 8 | 16 | 6 |
| Heat sagging (mm) | 6 | 3 | 4 | 7 | 3 | 5 |
| Short shot pressure | 45 | 48 | 49 | 40 | 47 | 54 |

*1 Crystallization promoter supplied by Pfeizer MSP
*2, *3 and *4 Stabilizers supplied by Adeca Argus Chem.

We claim:

1. A thermoplastic polyester resin composition having an improved impact resistance, which comprises
    (A) 30 to 70 parts by weight of a polyester resin mainly composed of units derived from an aromatic dicarboxylic acid having 8 to 22 carbon atoms or a functional derivative thereof and units derived from an alkylene glycol, cylcloalkylene glycol, or aralkylene glycol, having 2 to 22 carbons;
    (B) 5 to 28 parts by weight of a polycarbonate resin; wherein said polycarbonate resin is prepared by reacting a dihydroxyl compound and an optional polyhydroxyl compound with phosgene or a diester of carbonic acid; said dihydroxyl compound being a dihydroxydiarylalkane selected from the group consisting of 4,4'-dihydroxy-2,2-diphenylpropane (bisphenol A), tetramethylbisphenol A and bis-(4-hydroxyphenyl)-p-diisopropylbenzene; and said optional polyhydroxyl compound is selected from the group consisting of phloroglucinol, 4,6-dimethyl-2,4,6-tri-(4-hydroxyphenyl)-heptene, 4,6-dimethyl-2,4,6-tri-(4-hydroxyphenyl)-heptane and 1,3,5-tri-(4-hydroxyphenyl)benzene;
    (C) 5 to 35 parts by weight of a graft copolymer obtained by graft-polymerizing at least one monomer selected from the group consisting of aromatic vinyl monomers in the presence of a rubbery polymer selected from the group consisting of polybutadiene rubbers, copolymers comprising at least 50% by weight of butadiene units and a minor amount of styrene units or acrylonitrile units, polyacrylic acid ester rubbers, polyorganosiloxane rubbers, and composite rubbers comprising at least two of these rubbers; and
    (D) 10 to 45 parts by weight of a polyphenylene ether resin, wherein said polyphenylene ether resin is a homopolymer or copolymer having recurring units represented by the following formula:

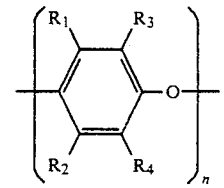

wherein $R_1$, $R_2$, $R_3$, and $R_4$ are independently selected from the group consisting of a hydrogen atom, alkyl groups, halogen atoms, a nitro group and an amino group and n is a number of at least 30;
which further comprises
    (E) 2 to 20 parts by weight, per 100 parts by weight of the resin composition comprising components (A) through (D), of a copolymer having a main chain of a polyolefin copolymerized with glycidyl methacrylate and a side chain of a styrene polymer, in which the content of glycidyl methacrylate in the polyolefin copolymerized with glycidyl methacrylate is 5 to 30% by weight;
wherein the styrene polymer constituting the side chain of the copolymer (E) is polystyrene or a copolymer comprising at least 80% by weight of styrene and not more than 20% by weight of maleic anhydride or methyl methacrylate; and,
wherein the content of the styrene polymer in the copolymer (E) is from 10 to 90% based on the copolymer (E); and, wherein the amount of polyester resin (A) is larger than the amount of the polyphenylene ether resin (D).

2. The thermoplastic polyester resin composition according to claim 1, wherein the polyester resin (A) is mainly composed of units derived from terephthalic acid and units derived from an alkylene glycol, cycloalkylene glycol or aralkylene glycol, having 2 to 22 carbon atoms.

3. The thermoplastic polyester resin composition according to claim 1, wherein the polyester resin (A) is selected from the group consisting of polybutylene terephthalate, polyhexylene terephthalate and polyethylene terephthalate.

4. The thermoplastic polyester resin composition according to claim 1, wherein said graft copolymer (C) comprises 30 to 80% by weight, based on the graft copolymer, of the rubbery polymer.

5. The thermoplastic polyester resin composition according to claim 1, wherein the monomer to be graft-polymerized comprises at least one monomer selected from the group consisting of styrene, α-methylstyrene, methyl methacrylate and ethyl methacrylate.

6. The thermoplastic polyester resin composition according to claim 1, wherein said graft copolymer (C) can be obtained by the stepwise graft polymerization wherein a styrene type monomer is graft-polymerized at the final stage or by the simultaneous graft polymerization of a monomer mixture containing a styrene type monomer.

7. The thermoplastic polyester resin composition according to claim 1, wherein the polyphenylene ether resin (D) is selected from the group consisting of poly(2,6-dimethyl-1,4-phenylene)ether, poly(2,3,6-trimethyl-1,4-phenylene)ether, poly(2,6-diethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenyl)ether, a (2,6-dimethyl-1,4-phenylene)ether/(2,3,6-trimethyl-1,4-phenylene)ether copolymer, a (2,6-dimethyl-1,4-phenylene)ether/(2,3,6-trimethyl-1,4-phenylene)ether copolymer, and a (2,6-dimethyl-1,4-phenylene)ether/2,3,6-triethyl-1,4-phenylene)ether copolymer.

8. The thermoplastic polyester resin composition according to claim 1, wherein the polyphenylene ether resin (D) has a reduced viscosity of 0.3 to 0.7 dl/g as measured at 25° C. in chloroform.

9. The thermoplastic polyester resin composition according to claim 1, wherein the polyolefin in the copolymer (E) is derived from at least one α-olefin selected from the group consisting of ethylene, propylene and butene-1.

10. The thermoplastic polyester resin composition according to claim 1, wherein the polyolefin in the copolymer (E) is polyethylene and occupies at least 50% by mole of the main chain of the copolymer (E).

* * * * *